United States Patent [19]
Lands et al.

[11] Patent Number: 5,199,732
[45] Date of Patent: Apr. 6, 1993

[54] APPARATUS FOR UNLOCKING A BOGIE ON A TRACTOR-TRAILER RIG

[75] Inventors: Herbert D. Lands, Cahokia; Phillip H. Clark, Smithton, both of Ill.

[73] Assignee: Herbert Lands, Inc., Cahokia, Ill.

[21] Appl. No.: 739,691

[22] Filed: Aug. 2, 1991

[51] Int. Cl.⁵ .............................................. B62D 53/06
[52] U.S. Cl. ............................ 280/407.1; 280/149.2; 180/209
[58] Field of Search ............... 280/149.2, 407.1, 405.1, 280/482, 428, 432; 180/209, 24.02

[56] References Cited
U.S. PATENT DOCUMENTS

Re. 23,704  9/1953  De Lay .
2,750,207   6/1956  Greenway .
2,799,516   7/1957  Greenway .
2,835,504   5/1958  Acker .
3,030,125   4/1962  Braunberger .
4,286,797   9/1981  Mekosh, Jr. et al. .
4,353,565  10/1982  Smith et al. .
4,526,395   7/1985  Arguin .
4,580,805   4/1986  Bertolini .
4,944,522   7/1990  Hart .
4,958,845   9/1990  Parks .
5,137,296   8/1992  Forman ........................... 280/407.1

Primary Examiner—Margaret A. Focarino
Assistant Examiner—Paul Dickson
Attorney, Agent, or Firm—Rogers, Howell & Haferkamp

[57] ABSTRACT

A pneumatically operated apparatus is provided for automatically disengaging the bogie pins from the trailer rails of a tractor-trailer rig. The apparatus is designed to be retrofit to existing truck trailer and bogie assemblies and to work along side the conventional manual pin retracting mechanisms of the bogie assemblies. The apparatus includes safety features that prevent the apparatus from retracting the bogie pins of the trailer and bogie assembly when the emergency brakes of the assembly have not been engaged. The apparatus is also provided with safety features that automatically control the bogie pins to reengage in the holes of the trailer rails upon disengagement of the emergency brakes of the tractor-trailer rig.

27 Claims, 2 Drawing Sheets

APPARATUS FOR UNLOCKING A BOGIE ON A TRACTOR-TRAILER RIG

BACKGROUND OF THE INVENTION (1) Field of the Invention

The present invention pertains to a pneumatically controlled apparatus for automatically disconnecting a trailer from a supporting bogie in a tractor-trailer rig.

(2) Description of the Related Art

Tractor-trailer rigs comprising truck trailers supported by bogies in a manner that enables a sliding adjustment of the positions of the trailers on the bogies are well known in the prior art. In general, this type of trailer rig is comprised of a truck trailer having a pair of spaced, parallel rails extending longitudinally beneath the bed of the trailer. The truck bogie is positioned between the pair of rails and is connected to the rails in such a way that the position of the bogie beneath the trailer is adjustable by sliding the bogie fore and aft relative to the trailer The bogie is adjusted relative to the trailer it supports in order to adjust the load carried by the trailer on the bogie. Additionally, a typical bogie is often adjusted forward relative to the trailer it supports to facilitate cornering with the adjusted tractor-trailer rig.

A bogie is typically constructed with a frame supporting the wheels and suspension systems of the bogie, the wheel brakes, and a pneumatic pressure reservoir tank and pneumatic pressure conduits. The conduits provide fluid communication between a source of pneumatic pressure on the tractor and the reservoir tank and wheel brakes of the bogie, and between the brakes and the brake controls in the tractor pulling the trailer and bogie assembly. The pneumatic conduits typically include a service conduit system for conducting the supply of pneumatic pressure to the service wheel brakes, enabling selective engagement of the brakes during driving operations of the tractor-trailer rig. The typical bogie also comprises a second, emergency or parking brake pneumatic conduit system that controls the emergency brakes of the bogie. The emergency brake system controls the emergency brakes to engage when pneumatic pressure is drained from the emergency brake system, and to disengage when pneumatic pressure is supplied to the emergency brake system. The emergency brake system is always disengaged when the tractor-trailer rig is operated over the road.

In most truck trailer and bogie assemblies, the spaced longitudinal rails of the trailer are provided with a series of holes along a portion of their lengths. The bogie is provided with four pins that engage in four of the rail holes to secure the bogie in an adjusted position relative to the trailer. By retracting the pins out of the rail holes, the bogie is free to be adjusted fore and aft relative to the trailer rails to position the bogie in an optimum position beneath the trailer for a desired turning radius of the tractor-trailer rig or a desired distribution of load on the bogie wheels.

A manually operated mechanical linkage system is provided on the bogie frame for retracting the four pins from the holes in the trailer rails. Prior to retracting the pins, the tractor-trailer rig operator first sets the emergency brakes of the truck trailer and bogie assembly. A manual handle of the linkage mechanism near the forward end of the bogie is then manipulated by the rig operator, causing the four pins to be retracted from the trailer rail holes and locking the pins in their retracted positions. With the pins retracted and the bogie emergency brakes engaged, the trailer is free to slide over the bogie. The tractor-trailer rig operator then drives the tractor either forward or backward to adjust the position of the trailer on the bogie either forward or backward, respectively. Once the trailer has been moved over the bogie to its desired position relative to the bogie, the operator then exits the tractor and releases the manual handle of the linkage mechanism, causing a spring bias of the linkage mechanism to reinsert the four pins into holes of the trailer rails and thereby securing the bogie in its adjusted position beneath the trailer.

Use of the prior art pin retracting linkage mechanism has certain disadvantages. Very often, after prolonged periods of use of the truck trailer and bogie assembly, the trailer rails and bogie pins become worn and corroded. This often causes the bogie pins to become jammed in the trailer rail holes, making disconnection of the bogie from the trailer difficult.

A further disadvantage of the prior art pin releasing mechanism is often encountered when the mechanism is operated. The manual handle of the mechanism is frequently positioned just in front of the forward, left wheels of the bogie. To release and engage the mechanism, a person must stand directly in front of the forward, left bogie wheels to manipulate the handle of the mechanism. This exposes the person to considerable danger should the emergency brakes of the tractor-trailer rig slip while attempting to retract or reengage the bogie pins into the rail holes of the trailer.

What is needed to overcome these disadvantages associated with the prior art bogie pin retracting mechanism is a power actuated system for retracting the pins, such as a system that automatically operates under the existing pneumatic pressure of the tractor-trailer rig. Such a system would provide an increased force for disengaging stuck bogie pins from the rail holes of a truck trailer, and would also provide automatic operation that does not require a person to stand in front of the forward, left bogie wheels when operating the device as is necessary when operating the prior art mechanism.

SUMMARY OF THE INVENTION

The present invention provides a pneumatically operated apparatus for automatically unlocking the bogie pins from the trailer rails of a tractor-trailer rig. The apparatus is specifically designed to be retrofit to existing truck trailer and bogie assemblies and to work along side the prior art manual pin retracting mechanisms often employed in prior art trailer and bogie assemblies. The apparatus is also designed to be assembled in newly constructed truck trailer and bogie assemblies and to work along side the conventional manually operated pin retracting mechanisms of the assemblies.

The apparatus of the invention includes safety features that prevent the apparatus from retracting the bogie pins of a trailer and bogie assembly when the emergency brakes of the assembly have not been engaged. The apparatus is also designed to automatically cause the bogie pins to engage in the rail holes of the trailer in response to the emergency brakes of the trailer and bogie assembly being disengaged. The apparatus of the invention is tapped into the existing pneumatic pressure circuit of the trailer and bogie assembly, and is easily isolated from the pneumatic pressure system of the trailer and bogie assembly should fluid leaks develop in the apparatus If a leak should occur in the apparatus of the invention, isolating the apparatus has no effect on the conventional manual pin retracting mechanism of the trailer and bogie assembly.

The apparatus of the invention is basically comprised of a pneumatic pressure actuator assembly, a manual control valve, a pressure sensitive pilot valve, and a pair of manual cut off valves all of which are interconnected with the existing emergency or parking brake pneumatic system of a truck trailer and bogie assembly.

The pneumatic pressure actuator assembly includes a bracket designed to be attached to the existing framework of a truck trailer bogie. The bracket supports a conventional, commercially available pneumatic pressure actuator. The actuator is comprised of a housing containing a diaphragm, a pneumatic pressure chamber on one side of the diaphragm, and a reciprocating rod attached to the opposite side of the diaphragm. The rod extends from the actuator housing to a free end of the rod. A yoke is mounted for limited sliding movement over the free end of the rod.

Supplying pneumatic pressure to the actuator pressure chamber causes the diaphragm to extend or move the free end of the rod out away from the actuator housing. Draining the pneumatic pressure from the pressure chamber causes a spring inside the actuator housing to return the diaphragm to its at rest position, causing the rod free end to move back toward the actuator.

The bracket of the pneumatic actuator assembly also supports a pivot pin. A pivot arm is mounted on the pivot pin for pivoting movement of the arm relative to the actuator assembly. The arm has opposite first and second ends positioned on opposite sides of the pivot pin. A first end of the pivot arm is connected to the yoke mounted on the actuator rod. The opposite, second end of the pivot arm is connected to a linkage member that, in turn, is connected to a second bracket. The second bracket is mounted on a control shaft of the conventional pin retracting mechanism of the truck trailer and bogie assembly Rotation of the control shaft in opposite directions about its axis controls the bogie pins to retract from and extend into the holes of the trailer rails. The second bracket is mounted by a pair of U-bolts to the control shaft to enable adjustment of the position of the second bracket on the control shaft. Alternatively, the second bracket may be welded in its adjusted position on the control shaft.

Supplying pneumatic pressure to the pneumatic pressure chamber of the actuator causes the actuator rod to extend from the actuator Extension of the actuator rod causes the pivot arm to pivot about the pivot pin. The pivoting movement of the pivot arm causes the linkage member connected to the pivot arm to pull the second bracket connected to the bogie pin retracting mechanism control shaft, thereby causing the shaft to rotate and retract the bogie pins from the trailer rail holes.

The manual control valve is connected in fluid communication with the pneumatic pressure chamber of the actuator assembly by a length of fluid conduit. The control valve is basically a conventional, commercially available spring loaded two position valve that, when moved to its first, open position, causes pneumatic pressure to be supplied to the pneumatic pressure chamber of the actuator. When the control valve is moved to its second, closed position, the supply of pneumatic pressure to the pneumatic pressure chamber of the actuator assembly is interrupted and the pneumatic pressure chamber is communicated with a drain through the valve. This causes the spring bias of the actuator to move the actuator rod toward the actuator which, in turn, causes the control shaft of the pin retracting mechanism to reinsert the bogie pins into the trailer rail holes. The control valve is spring loaded so that, if pneumatic pressure supplied to the control valve is cut off, the valve automatically springs to its closed position and communicates the pneumatic pressure chamber of the actuator with a drain outlet of the control valve, thereby exhausting the chamber of the actuator.

The pressure sensitive pilot valve is generally a conventional, commercially available valve that controls the communication of fluid pressure from one conduit to a second conduit dependent on the absence of fluid pressure in a third conduit. The pilot valve is constructed with a fluid pressure inlet and a fluid pressure outlet, a pressure sensing inlet and a pressure drain outlet. The fluid pressure inlet of the valve is communicated with the existing source of pneumatic pressure of the truck trailer and bogie assembly. The fluid pressure outlet is communicated with the manual control valve. The pressure sensing inlet is communicated with the existing emergency or parking brake line of the truck trailer and bogie assembly. When fluid pressure is present at the pressure sensing inlet of the valve, the pilot valve automatically interrupts fluid communication between the fluid pressure inlet and the fluid pressure outlet of the valve, and automatically communicates the fluid pressure outlet of the valve to the valve drain outlet. When fluid pressure is absent at the fluid pressure sensing inlet of the valve, the pressure sensitive valve automatically opens fluid communication between the fluid pressure inlet and the fluid pressure outlet of the valve.

In operation of the apparatus of the present invention, the tractor-trailer rig operator first sets the emergency or parking brakes of the trailer and bogie assembly from inside the tractor cab. In conventional emergency or parking brake systems of tractor-trailer rigs, the emergency brakes of the truck bogie are disengaged by pneumatic pressure being supplied to the brake assemblies by the fluid conducting conduits of the emergency brake lines. By the operator's setting the emergency brakes, the pneumatic pressure is exhausted from the emergency brake lines and the emergency brakes of the truck bogie are engaged.

Setting the emergency brakes not only exhausts the pneumatic pressure from the emergency brake lines, but also exhausts the pneumatic pressure at the pressure sensing inlet of the pressure sensitive pilot valve which communicates with an existing emergency brake line of the trailer and bogie assembly. This causes the valve to open, communicating the pneumatic pressure inlet of the valve with the pneumatic pressure outlet of the valve, and supplying pneumatic pressure from a reservoir tank of the truck trailer and bogie assembly to the manual control valve.

After setting the emergency brakes, the operator exits the tractor cab and actuates the manual control valve of the apparatus of the present invention. Actuating the manual control valve opens the valve and causes pneumatic pressure to be communicated from the reservoir tank, through the pressure sensitive pilot valve and the manual control valve, to the pneumatic pressure actuator assembly. The pneumatic pressure supplied to the control valve holds the valve in its opened position against the bias of the valve spring. The pneumatic pressure supplied by the reservoir tank and routed through the pilot valve and control valve is conducted by fluid conduits to the pneumatic pressure chamber of the pressure actuator.

The pneumatic pressure supplied to the actuator pressure chamber displaces the diaphragm of the actuator and causes the reciprocating rod of the actuator to be extended from the actuator. Movement of the rod from the actuator displaces the yoke mounted on the free end of the rod which in turn pivots the pivot arm about its pivot connection to the actuator bracket. The pivoting movement of the pivot arm pulls on the linkage member connected to the second bracket mounted on the control shaft of the conventional pin retracting mechanism, causing the control shaft to rotate. The rotation of the control shaft in response to the movement of the actuator rod causes the pins of the mechanism to be retracted from the rail holes of the trailer. The retraction of the pins disconnects the truck trailer from the bogie and enables the sliding adjustment of the trailer fore and aft over the bogie.

Once the trailer has been moved to its adjusted position on the bogie, the operator deactivates the manual control valve to cause the bogie pins to be reset in the holes of the trailer rails. Closing the manual control valve interrupts the communication of pneumatic pressure from the reserve tank, through the pilot valve to the pneumatic actuator, and communicates the pneumatic pressure chamber of the actuator with the drain outlet of the manual valve. This causes the actuator pressure chamber to drain, which in turn causes the diaphragm of the actuator to return to its at rest position pulling the actuator rod back toward the actuator. The movement of the actuator rod back toward the actuator frees up the yoke mounted for sliding movement on the rod end. The yoke is caused to move with the rod free end toward the pneumatic actuator by the springs of the existing pin retracting mechanism of the bogie as the springs cause the bogie pins to automatically extend into the rail holes of the trailer, thereby reconnecting the trailer in its adjusted position to the bogie.

The pair of manual cut off valves are provided with the apparatus of the invention to completely isolate the apparatus from the existing pneumatic pressure lines of the trailer and bogie assembly. Should a pneumatic pressure leak develop in the apparatus of the invention, the invention can be isolated from the brake lines of the truck trailer and bogie assembly, enabling the trailer and bogie assembly to be operated without the use of the apparatus of the invention.

Furthermore, the sliding connection between the actuator rod and yoke enables the existing pin retracting mechanism of the trailer and bogie assembly to be used to retract and reengage the bogie pins in the rails of the trailer without interference from the apparatus of the invention retrofit to the trailer and bogie assembly.

By employing a pressure sensitive pilot valve in the apparatus of the invention, and communicating this valve with the existing emergency brake line of the trailer and bogie assembly, the apparatus of the invention is prevented from operating to disengage the bogie pins from the trailer rails unless the emergency brakes of the trailer and bogie assembly are set and pneumatic pressure is absent from the emergency brake lines. Even after operating the apparatus of the invention to remove the bogie pins from the trailer rails, should pneumatic pressure be supplied to the emergency brake lines to disengage the emergency brakes, the pressure sensitive pilot valve of the apparatus will automatically close and exhaust the pneumatic pressure from the actuator pressure chamber, causing the apparatus to automatically reinsert the bogie pins into the rails of the trailer.

BRIEF DESCRIPTION OF THE DRAWINGS

Further objects and features of the present invention are revealed in the following detailed description of the preferred embodiment of the invention and in the drawing figures wherein.

DESCRIPTION OF THE PREFERRED EMBODIMENT

The apparatus of the present invention is designed to be retrofit to existing bogie pin retracting mechanisms on truck trailer and bogie assemblies, as well as being assembled into newly constructed truck trailer and bogie assemblies along side the prior art manual pin retracting mechanisms of those assemblies. To fully understand the operation of the apparatus of the present invention, an understanding of how the prior art manual bogie pin retracting mechanism operates is necessary.

Figure 1:
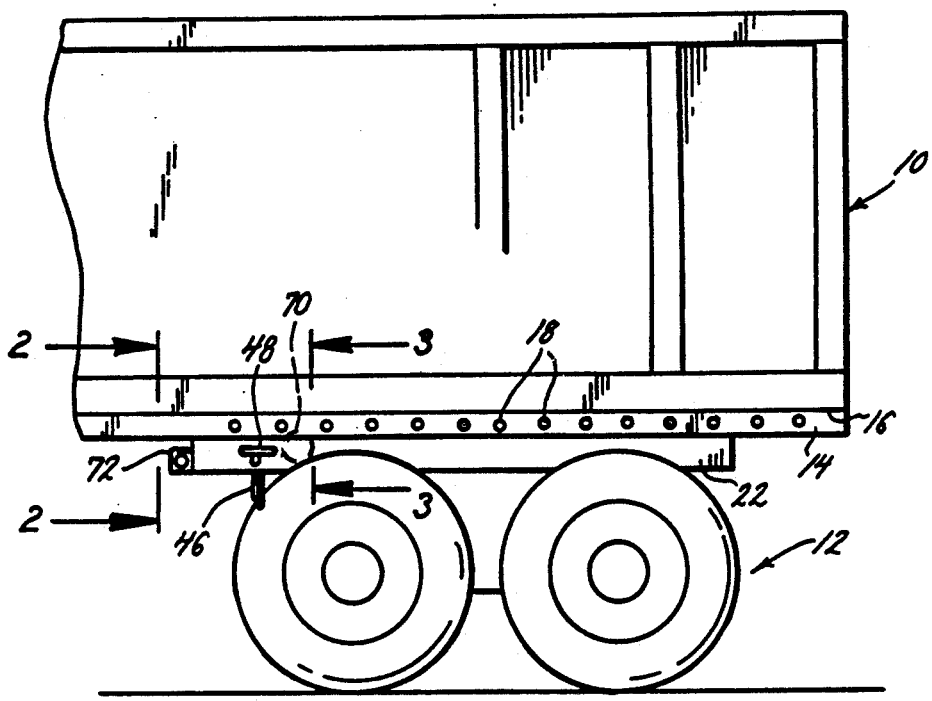
FIG. 1 is a partial side elevation view showing one operative environment of the present invention.
Figure 2:
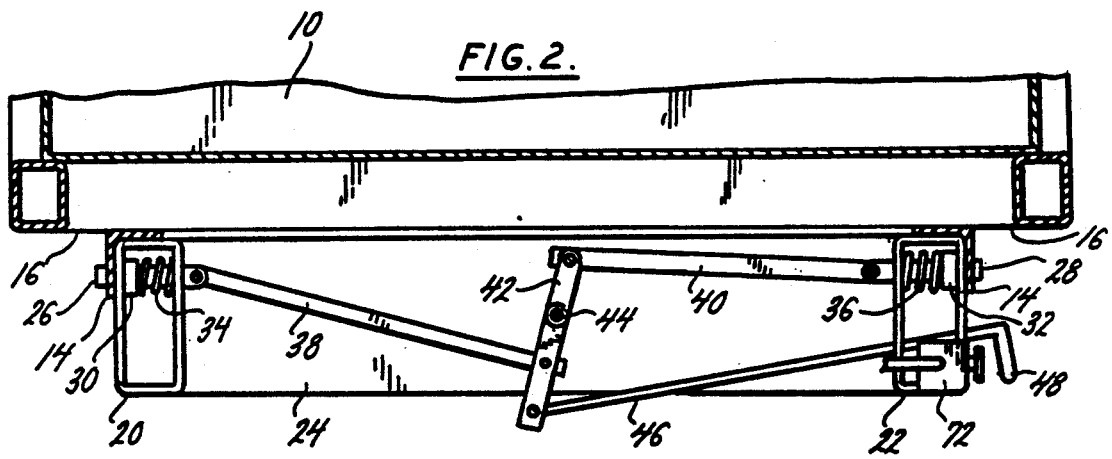
FIG. 2 is a partial front elevation view, in section, of the operative environment of the invention taken along the line 2—2 of FIG. 1.

FIGS. 1 and 2 of the drawing figures show a conventional truck trailer 10 and bogie 12 assembly. The truck trailer 10 is provided with a pair of spaced, parallel rails 14 extending longitudinally along and secured to the underside 16 of the trailer bed. Each of the rails 14 has a plurality of holes 18 extending therethrough, the holes in each rail being spaced about six inches apart.

Figure 3:
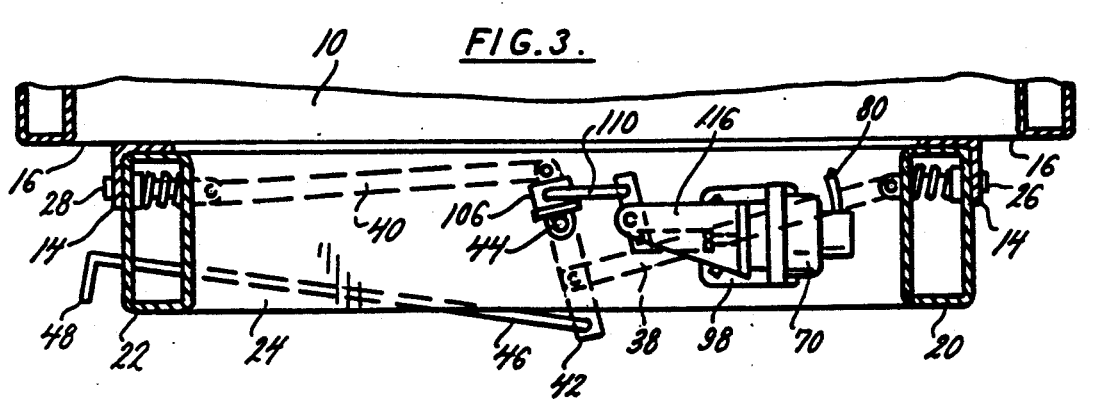
FIG. 3 is a partial elevation view, in section, of the operative environment of the invention taken along the line 3—3 of FIG. 1.

The truck bogie 12 includes a framework constructed from a pair of laterally spaced, longitudinally extending channel members 20, 22 and a series of laterally extending cross members 24 connected between the two channel members 20, 22. As is best seen in FIGS. 2 and 3, the channel members 20, 22 are laterally spaced to fit just inside the lateral spacing of the trailer rails 14. The bogie framework supports the wheels, suspension system, wheel brakes and their associated pneumatic conduit system, as well as the conventional manually actuated bogie pin retracting mechanism.

The conventional bogie pin retracting mechanism is best seen in FIG. 2 of the drawing figures. The pin retracting mechanism controls four bogie pins that secure the truck trailer 10 to the bogie 12. Two of the bogie pins 26, 28 are shown in FIG. 2, this pair of bogie pins being positioned toward the front of the bogie 12. It should be understood that in many prior art pin retracting mechanisms of this type, an additional pair of bogie pins (not shown) are also provided toward the rearward end of the bogie 12. The connection of the rearward pair of bogie pins to the conventional pin retracting mechanism and the operation of the rearward pair of bogie pins is substantially the same as that of the forward pair of bogie pins and only the connection of the forward pair of bogie pins 26, 28 to the conventional pin retracting mechanism and the operation of the forward pins will be described. The apparatus of the invention is designed to work with pin retracting mechanisms of both the two pin type and the four pin type.

Each of the bogie pins 26, 28 are mounted for reciprocating lateral movement in the channel members 20, 22 of the bogie. As seen in FIG. 2, each of the pins 26, 28 are provided with stop abutments 30, 32 that limit the lateral movement of the pins, and coil springs 34, 36 that bias the pins outward to their engagement positions shown in FIG. 2. In the positions of the bogie pins 26, 28 shown in FIG. 2, the pins are biased by the coil springs 34, 36 to their engagement positions extending through an opposed pair of holes 18 in the trailer rails 14. The pins extending through the trailer holes secure the bogie channel members 20, 22 against longitudinal sliding movement relative to the trailer rails 14 and thereby secure the bogie 12 against sliding movement relative to the trailer 10. It should be understood that in the four pin type of mechanisms the rearward pair of bogie pins (not shown) are mounted on the bogie channel members 20, 22 and engage in opposed rail holes 18 of the trailer in the same manner as the pins shown in FIG. 2.

The inboard ends of each of the bogie pins 26, 28 are pivotally connected to linkage members 38, 40. The opposite ends of the linkage members 38, 40 from their connections to the bogie pins 26, 28 are pivotally connected to a lever member 42. The lever member 42 is secured on a control shaft 44. As seen in FIG. 2, the control shaft 44 is positioned on the lever member 42 intermediate the pivoting connections of the lever member 42 to the linkage members 38, 40. The control shaft 44 extends through the bogie frame cross members 24 toward the rearward end of the bogie, or into the drawing figure as viewed in FIG. 2. The control shaft 44 is mounted for rotation on the bogie frame cross members 24. At the rearward end of the bogie 12, a second set of linkage members and a second lever member are operatively connected to the control shaft 44 and the rearward pair of bogie pins (not shown) in substantially the same manner as the linkage members 38, 40, the lever member 42, and the forward bogie pins 26, 28 shown in FIG. 2.

A control rod 46 is pivotally connected to the lower end of the lever member 42. The control rod 46 extends from its connection to the lever member 42 through one of the bogie channel members 22 to a handle 48 positioned on the outboard side of the bogie channel member.

In operation of the conventional pin retracting mechanism shown in FIG. 2, pulling the control rod handle 48 out from the bogie channel member 22 will cause the control shaft 44 to rotate counterclockwise about its center axis. The rotation of the control shaft 44 will also rotate the lever member 42 secured to the shaft. The counterclockwise rotation of the lever member 42 pulls both of the linkage members 38, 40 toward the center of the bogie, causing the linkage members 38, 40 to pull their associated bogie pins 26, 28 toward the center of the bogie assembly 12 against the bias of the bogie pin coiled springs 34, 36. The lateral movement of the bogie pins 26, 28 toward the center of the bogie assembly 12 disengages the pins from the trailer rail holes 18, thus disconnecting the bogie 12 from the trailer 10. The control rod 46 is engaged in a slot in the channel member to hold the bogie pins in their retracted positions.

With the bogie pins so disengaged and the emergency or parking brakes of the bogie set, the tractor trailer rig operator may now move the cab of the rig either forward or backward to adjustably position the trailer 10 forward or backward on the bogie 12.

Once the trailer 10 has been moved to its desired adjusted position above the bogie 12, the tractor-trailer rig operator again engages the bogie pins 26, 28 in the trailer rail holes 18 to secure the bogie to the trailer for over-the-road operation. The operator disengages the control rod 46 from its locked position in the bogie channel member 22 and the bias of the bogie pin springs 34, 36 causes the pin retracting mechanism to spring back to its at rest position shown in FIG. 2 with the bogie pins 26, 28 extending through a pair of trailer rail holes 18, thereby securing the bogie in its adjusted position to the underside of the trailer 10. With the bogie so secured to the trailer, the tractor-trailer rig is ready once again for over-the-road operation with the wheels of the rig repositioned in their adjusted positions below the trailer.

It should be understood that, although only the operation of the forward pair of bogie pins 26, 28 has been described, the operation of the rearward pair of bogie pins (not shown) is substantially identical to that of the forward pair of pins.

It should also be understood that the operative environment described above and shown in the drawing figures is only one example of a prior art mechanism with which the apparatus of the invention may be used. The mechanism description is not intended to be limiting, and the apparatus of the invention may be used with a variety of similar pin retracting mechanisms without departing from the intended scope of the invention set forth in the claims below.

The apparatus of the present invention is designed to be retrofit to conventional bogie pin retracting mechanisms similar to the type described above. The apparatus is interconnected with the existing pin retracting mechanism of a truck trailer and bogie assembly in a manner that enables the existing mechanism to still be operated manually if so desired.

Figure 4:
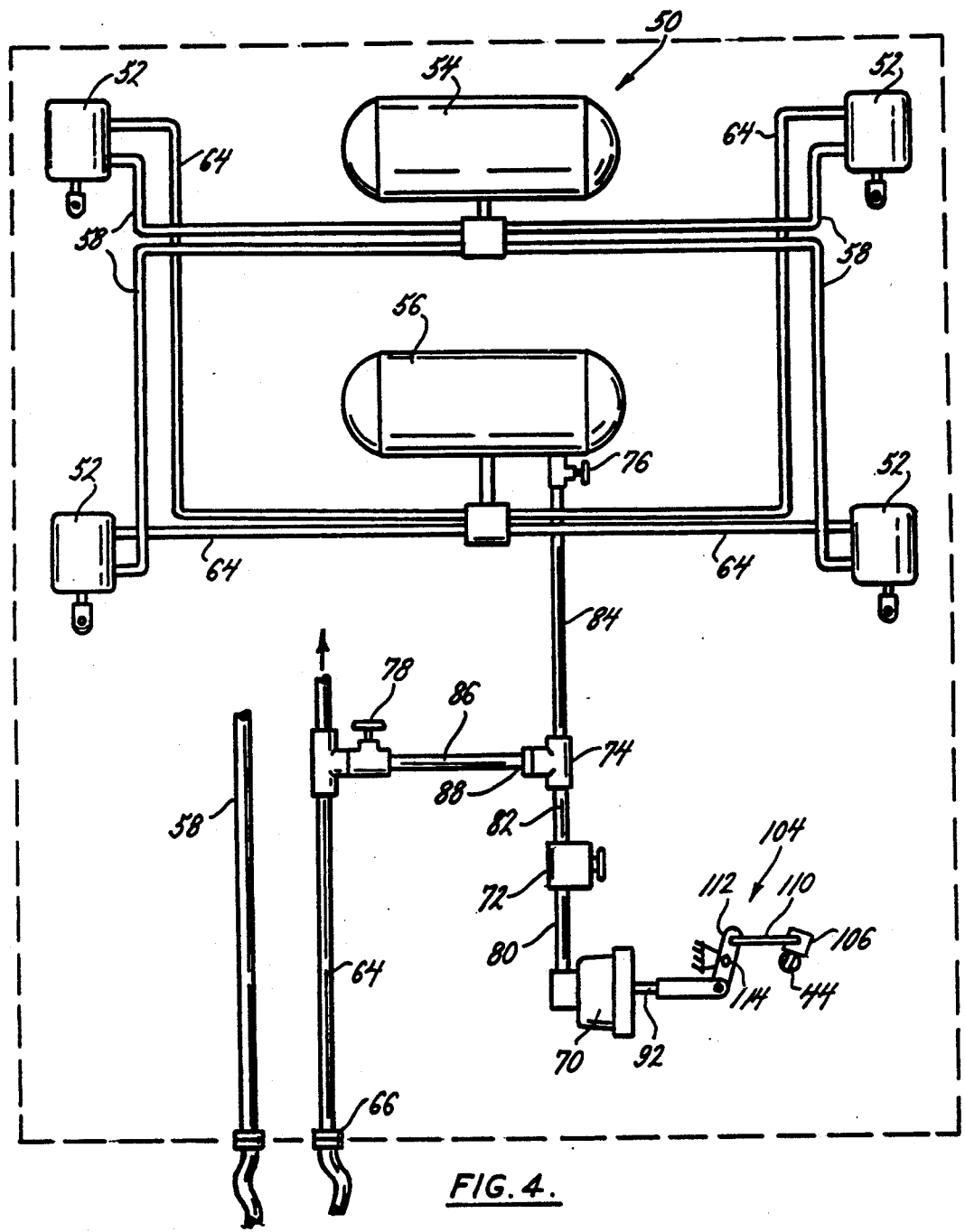
FIG. 4 is a schematic diagram showing the connection of the apparatus of the present invention to an existing pneumatic pressure circuit of a truck trailer and bogie assembly.

FIG. 4 of the drawing figures shows a schematic representation of the pneumatic pressure fluid conduit system 50 typically employed on truck trailer and bogie assemblies for engaging the service brakes and the emergency brakes of a tractor-trailer rig. This system is well known in the art and will not be described in detail here. The system is basically comprised of four pneumatic pressure operated brake assemblies 52 that engage the service brakes and the emergency brakes of the bogie wheels in response to actuation of the brakes from the tractor cab. The system also includes a pneumatic pressure service tank 54, a pneumatic pressure emergency tank 56 and a system of conduits communicating the service and emergency tanks with the four pneumatic braking assemblies 52. The service braking assemblies 52 are selectively engaged by supplying pneumatic pressure through the system of service conduits 58 from the service 54 tank. The operation of the service brakes is well known in the art and will not be described here.

In addition to the service brakes of the brake assemblies 52 shown in the schematic of FIG. 4, typical brake assemblies 52 of a tractor-trailer rig are also provided with emergency brakes. The emergency brakes are spring loaded brakes that are automatically engaged by the extension of a coil spring associated with each of the emergency brakes. The engagement of the emergency brakes is also controlled by pneumatic pressure. However, unlike the service brakes of the braking assemblies 52 that are engaged by receiving a supply of pneumatic pressure, the emergency brakes of the braking assemblies 52 are engaged by interrupting or draining a supply of pneumatic pressure to the emergency brakes, and are disengaged by supplying pneumatic pressure to the emergency brakes. Emergency brakes are typically constructed so that when pneumatic pressure is supplied to the braking assemblies, the pneumatic pressure compresses the emergency brake springs and disengages the emergency brakes. When the supply of pneumatic pressure to the braking assemblies is cut off, the brake springs are allowed to extend from their compressed state. The extension of the brake springs automatically engages the emergency brakes of the bogie. The emergency brakes of a truck trailer and bogie are designed in such a manner for safety considerations. Should the trailer and bogie assembly be separated from the tractor cab while the tractor-trailer is operating over-the-roadway, the emergency braking line 64 communicating the system with the cab will brake away at its connector 66 to the cab. This will cause the pneumatic pressure present in the emergency braking line 64 to drain out of the line. Without the presence of pneumatic pressure in the emergency braking line 64, the spring loaded emergency brakes of the braking assemblies 52 will automatically engage and brake the wheels of the bogie. This will cause the truck trailer and bogie assembly to come to a stop shortly after being disconnected from the tractor cab.

When adjusting the position of a truck trailer over a bogie, the emergency brakes of the bogie are typically engaged to hold the bogie stationary as the trailer is adjustably positioned forward or backward over the bogie. Because the emergency brakes are most often used to brake the bogie when adjusting the position of the trailer on the bogie, the apparatus of the present invention is specifically designed to operate only when the emergency brakes of the bogie are engaged. This ensures that the bogie pins cannot be disengaged by the apparatus of the invention unless the emergency brakes of the bogie are engaged. It also ensures that the apparatus of the invention will cause the bogie pins to be automatically engaged in the trailer rail holes 18 at any time the bogie emergency brakes are disengaged during the operation of the apparatus of the invention.

The component parts of the apparatus of the invention are schematically shown in drawing FIG. 4. The component parts of the invention include a pneumatic pressure actuator 70, a spring loaded manual control valve 72, a pressure sensitive pilot valve 74, and a pair of manual cut off valves 76, 78. As seen in FIG. 4, each of the component parts of the apparatus of the invention are interconnected by pneumatic pressure conducting fluid conduits. The fluid pressure actuator 70 is connected in fluid communication with the manual valve 72 by a first length of conduit 80. The manual control valve 72 is connected in fluid communication with the pressure sensitive pilot valve 74 by a second length of conduit 82. The pilot valve 74 is connected in fluid communication with the first cut off valve 76 by a third length of conduit 84. The pilot valve 74 is also connected in fluid communication with the second cut off valve 78 by a fourth length of conduit 86. The first manual cut off valve 76 controls fluid communication between the pneumatic pressure reserve or emergency tank 56 and the third fluid conduit 84. The second manual cut off valve 78 controls fluid communication between the emergency brake line 64 of the truck trailer and bogie assembly and the fourth length of fluid conduit 86.

A section of the service brake line 58 and the emergency brake line 64 are shown at the bottom of FIG. 4 separate from the system of brake lines appearing at the top of FIG. 4. This is for illustration purposes only to better show the detail of the invention's connection to the emergency brake line. It should be understood that the sections of the service and emergency brake lines shown in FIG. 4 are a part of the overall brake line system of a conventional trailer and bogie assembly. Furthermore, although the apparatus of the invention is shown and described as communicating with the reserve tank 56 of the bogie pneumatic system, the apparatus may alternatively be tapped into the service tank 54 of the system without effecting the operation of the apparatus.

The pressure sensitive pilot valve 74 is a conventional, commercially available valve. Because the valve is conventional, its structure will not be described. The valve controls the fluid communication between the second fluid conduit 82 and the third fluid conduit 84 based on the presence or absence of pneumatic pressure in the fourth fluid conduit 86 communicating with the emergency brake line 64 of the bogie. When the emergency brakes of the bogie are disengaged by the presence of pneumatic pressure in the emergency brake line 64, the pneumatic pressure is communicated through the fourth conduit 86 to a pressure sensing inlet 88 of the pilot valve 74. With pneumatic pressure present at the pressure sensing inlet 88, the pilot valve closes and interrupts fluid communication between the second fluid conduit 82 and the third fluid conduit 84, and automatically establishes fluid communication between the second fluid conduit 82 and a drain or exhaust (not shown) of the valve, thereby draining the second conduit 82. When the emergency brakes of the bogie are engaged by exhausting the pneumatic pressure from the emergency brake line 64, the absence of pneumatic pressure in the emergency brake line is communicated through the fourth fluid conduit 86 to the pressure sensing inlet 88 of the pilot valve 74. With the absence of pneumatic pressure at the pressure sensing inlet 88, the pilot valve 74 automatically opens and communicates the second fluid conduit 82 with the third fluid conduit 84, enabling pneumatic pressure from the reserve tank 56 to be communicated through the third fluid conduit 84, the pilot valve 74, and the second fluid conduit 82 to the manual control valve 72.

The manual control valve 72 is a conventional, commercially available, spring loaded two position control valve. Because the control valve 72 is conventional, its structure will not be described. In a first, closed position of the manual valve 72 it interrupts fluid communication between the second fluid conduit 82 and the first fluid conduit 80, and communicates the first fluid conduit 80 with a drain or exhaust (not shown) of the valve, thereby draining the first conduit 80. In the second, open position of the manual valve it establishes fluid communication between the first and second conduits 80, 82. The manual control valve 72 is spring loaded. If the valve is in its second, open position and pneumatic pressure supplied to the valve 72 through the second conduit 82 is interrupted, the valve will automatically spring to its closed position cutting off fluid communication between the first 80 and second 82 fluid conduits and automatically communicating the first conduit 80 with the drain outlet (not shown) of the valve. If the manual valve 72 is moved to its second, open position while pneumatic pressure is present in the second conduit 82, the pneumatic pressure will hold the valve in its open position against the bias of the valve spring. Moving the manual valve to its second, open position while the emergency brakes of the bogie are engaged enables pneumatic pressure to be communicated from the reserve tank 54, through the third fluid conduit 84, the pressure sensitive pilot valve 74, the second fluid conduit 82, the manual control valve 72, and the first fluid conduit 80 to the pneumatic pressure actuator 70. The control valve 72 is preferably mounted on one of the bogie channel members 20.

The pneumatic pressure actuator 70 is also a conventional, commercially available item and its structure will not be described in detail. The pneumatic pressure actuator is generally comprised of a housing 90 containing a diaphragm (not shown). A pneumatic pressure chamber (not shown) is provided on one side of the diaphragm. The pressure chamber is connected in fluid communication with the first fluid conduit 80. A reciprocating actuator rod 92 is connected to the opposite side of the diaphragm from the pressure chamber. A free end of the rod 94 is provided with screw threads and an adjustment nut 96 is adjustably threaded on the rod. When pneumatic pressure is supplied to the pressure chamber of the actuator 70 through the first fluid conduit 80, the diaphragm is displaced in the actuator housing 90 and extends or moves the actuator rod 92 out of the housing 90 to the position shown in FIG. 5. When pneumatic pressure is exhausted from the pressure chamber of the actuator, the diaphragm returns to its at rest position and moves the actuator rod 92 back into or toward the actuator housing 90 to its at rest position shown in FIG. 4.

The actuator housing 90 is secured to a mounting bracket 98 by bolts 100 or welds. The mounting bracket 98 is secured to a cross member 24 of the bogie framework by bolts 102 or welds. In the preferred embodiment of the invention, the pneumatic actuator 70 is secured to the backside of the bogie framework cross member 24 positioned just behind the pair of bogie pins 26, 28, or on the backside of the cross member just behind the forward bogie pins in a four pin mechanism. The relative positions of the bogie pin retracting mechanism and the pneumatic actuator 70 of the invention are best seen in FIGS. 1-3. The pneumatic actuator 70 may be mounted on other bogie cross members adjacent the pin retracting mechanism control shaft 44 without effecting the operation of the apparatus of the invention.

Figure 5:
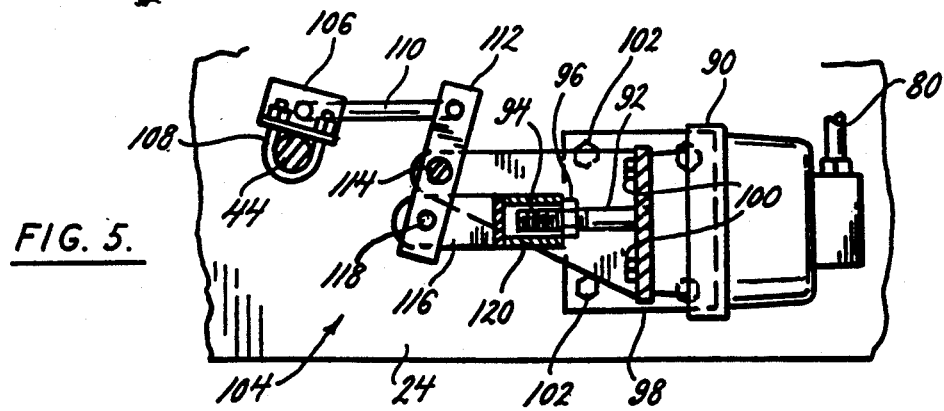
FIG. 5 is a partial view of the pneumatic actuator assembly of the present invention with component parts of the assembly shown in section.

The pneumatic actuator 70 is mechanically connected to the pin retracting mechanism control shaft 44 by a linkage system 104. The linkage system 104 includes an adjustment clamp 106 secured on the control shaft 44 by a pair of U-bolts 108. In the preferred embodiment of the invention, the U-bolts 108 are employed to secure the adjustment bracket 106 to the control shaft 44 so that the arcuate position of the bracket 106 on the shaft 44 can be adjusted to achieve the optimum performance of the apparatus of the invention in automatically retracting the bogie pins. A linkage member 110 is pivotally connected to the adjustment bracket 106 at one end, and is pivotally connected to a pivot arm 112 at its opposite end. The pivot arm 112 is mounted for pivoting movement on the actuator bracket 98 by a pivot pin 114 that is secured to the bracket 98. As seen in FIG. 5, the pivot pin extends through a midpoint of the pivot arm 112. On the opposite end of the pivot arm 112 from its connection to the linkage member 110, the arm is pivotally connected to a yoke member 116. In the preferred embodiment of the invention, the pivot connection of the pivot arm 112 to the linkage member 110 is 1.75 inches from the pivot connection of the arm 112 to the pivot pin 114, and the pivot connection of the arm 112 to the yoke member 116 is 1.5 inches from the connection of the arm 112 to the pivot pin 114. This difference in the lengths of the arm 112 on opposite sides of the pin 114 is very important in that it adjusts the force produced by the actuator 70 and transmitted to the control shaft 44 to a level of force sufficiently large to retract the pins 26, 28 even when the pins are stuck in the rail holes 18, but not so large that the actuator will bend or break parts of the pin retracting mechanism when the pins 26, 28 are stuck in the rail holes 18 and will not move. The yoke member 116 is provided with a pair of spaced prongs at one end, only one of which is visible in FIG. 5. A pivot pin 118 extends between the prongs of the yoke member and through the lower end of the pivot arm 112, thereby establishing a pivoting connection between the yoke member and pivot arm. The opposite end of the yoke member is provided with a hollow sleeve 120. As seen in FIG. 5, the internal diameter of the sleeve 120 is larger than the external diameter of the free end of the actuator rod 94. The loose fit of the sleeve 120 over the free end 94 of the actuator rod enables the existing pin retracting mechanism of the bogie to operate without being effected by the presence of the apparatus of the invention retrofit to the bogie. The manner in which the sleeve 120 operates will be explained below. As seen in FIG. 5, the end of the sleeve 120 engages against the adjustment nut 96 screw threaded on the actuator shaft 92. By the engagement of the sleeve end with the adjustment nut, extension of the actuator rod 92 from the actuator housing 90 will push the sleeve 120 and the yoke member 116 to its position shown in FIG. 5. However, retraction of the actuator rod 92 back into the actuator housing 90 will not pull the sleeve 120 and yoke member 116 to the right as viewed in FIG. 5 due to the sliding fit of the sleeve over the free end 94 of the rod.

In operation of the apparatus of the invention, the tractor-trailer rig operator first sets the emergency or parking brakes of the tractor-trailer rig. This exhausts the pneumatic pressure in the emergency brake line 64 and causes the spring loaded emergency brakes to engage, thereby braking the bogie 12. With the pneumatic pressure evacuated from the emergency brake line 64, pneumatic pressure is also evacuated from the fourth fluid conduit 86 and the pressure sensing inlet 88 of the pilot valve 74. The absence of pneumatic pressure in the fourth fluid conduit 86 and the pressure sensing inlet 88 of the pilot valve 74 automatically causes the pilot valve to open, establishing fluid communication between the second fluid conduit 82 and the third fluid conduit 84. With the opening of the pilot valve 74, pneumatic pressure contained in the reserve tank 56 is conducted through the third fluid conduit 84, the pilot valve 74, and the second fluid conduit 82 to the manual control valve 72. With the manual control valve 72 closed, the pneumatic pressure supplied by the service tank 54 is stopped at the control valve.

The tractor-trailer rig operator next exits the cab and walks back along the trailer and bogie assembly to the manual control valve 72 mounted on the channel member 22 of the bogie. The operator then actuates the manual control valve 72, causing the valve to open and establishing fluid communication between the second fluid conduit 82 and the first fluid conduit 80. This results in pneumatic pressure being supplied from the reserve tank 56 through the third fluid conduit 84, the pilot valve 74, the second fluid conduit 82, the manual control valve 72, and the first fluid conduit 80 to the pneumatic pressure actuator 70. The pneumatic pressure in the second fluid conduit 82 holds the manual valve 72 in its open position against the bias of the valve spring (not shown).

The pneumatic pressure supplied from the reserve tank 56 to the pressure chamber (not shown) of the actuator 70 displaces the diaphragm (not shown) of the actuator and causes the actuator control rod 92 to be extended from the actuator housing 90. The actuator rod 92 is moved out from the actuator 70 to its extended position shown in FIG. 5 by the movement of the diaphragm. The movement of the actuator rod 92 from the actuator 70 causes the adjustment nut 96 on the rod to push against the sleeve 120 and move the yoke member 116 to the left as viewed in FIG. 5. The movement of the yoke member 116 to the left causes the pivot arm 112 to pivot in a clockwise direction around the pivot pin 114. The pivoting movement of the pivot arm pulls on the linkage member 110, which in turn causes the adjustment bracket 106 secured to the control shaft 44 to rotate the control shaft about its axis. The rotation of the control shaft 44 about its axis causes the existing pin retracting mechanism of the bogie to retract the bogie pins from their engagement in the trailer rail holes 18. This disconnects the bogie from the trailer and enables the position of the trailer on the bogie to be adjusted by moving the tractor forward and backward relative to the bogie. With the emergency brakes of the bogie engaged, the bogie remains stationary as the tractor is pulled forward or backward and the trailer is adjustably positioned forward or backward over the bogie.

Because the operation of the apparatus of the invention is dependent on the emergency brakes of the bogie being engaged, the tractor-trailer rig operator cannot inadvertently drive away without the bogie pins automatically engaging in the trailer rail holes. Should the operator attempt to drive away by releasing the emergency brakes, pneumatic pressure would immediately be supplied to the emergency brake line 64 to disengage the emergency brakes. The pneumatic pressure in the emergency brake line 64 would be conducted through the fourth fluid conduit 86 to the pressure sensing inlet 88 of the pressure sensitive pilot valve 74, causing the pilot valve to close and automatically venting or draining the second fluid conduit 82 through the drain outlet (not shown) of the pilot valve. Communicating the second fluid conduit 82 to the drain outlet of the pilot valve exhausts the pneumatic pressure from the second conduit 82, causing the manual valve 72 to automatically move to its closed position under the bias of the valve spring (not shown). This communicates the first conduit 80 with the drain outlet (not shown) of the manual valve 72 and causes the pneumatic pressure in the pressure chamber of the actuator 70 to be exhausted through the first fluid conduit 80 and the drain outlet of the manual valve 72. This will cause the actuator diaphragm to return to its at rest position, retracting the actuator rod 92 back into the actuator housing and separating the adjustment nut 96 from its engagement with the yoke member sleeve 120. With the adjustment nut 96 separated from its engagement with the yoke member sleeve 120, the bias of the bogie pin springs 34, 36 will push the bogie pins laterally outward and reengage the pins in the holes of the trailer rails 14. This movement of the pins forced by the pin springs 34, 36 will also cause the mechanism control shaft 44 to rotate counterclockwise as viewed in FIG. 5. The counterclockwise rotation of the control shaft 44 is transmitted through the linkage system 104 to cause the yoke member 116 to move to the right as viewed in FIG. 5, and cause the yoke member sleeve 120 to slide to the right over the free end 94 of the actuator rod 92 to its at rest position shown in the schematic of FIG. 4. In the manner described above, the bogie pins 26, 28 are automatically reengaged in the trailer rail holes 18 upon disengagement of the emergency brakes of the bogie.

The yoke sleeve 120 connecting the yoke member 116 over the free end 94 of the actuator rod 92 enables the existing pin retracting mechanism of the bogie to be operated without being effected by the apparatus of the invention retrofit to the mechanism. With the apparatus of the invention disengaged, the actuator shaft 92 is retracted into the actuator housing and is positioned to the right of the rod position seen in FIG. 5. The retraction of the actuator shaft 92 back into the housing 90 causes the free end 94 of the shaft to slide to the right through the internal bore of the sleeve 120, but the rod end does not completely exit the internal bore of the sleeve. This maintains the sliding engagement of the sleeve 120 over the free end 94 of the rod. The sliding engagement of the sleeve 120 over the free end 94 of the rod enables the existing pin retracting mechanism to operate without being effected by the apparatus of the invention. As the existing pin retracting mechanism is engaged and disengaged, the yoke sleeve 120 will slide forward and back over the free end 94 of the actuator rod. It is only when the apparatus of the invention is actuated and the actuator rod 92 is extended out from the actuator 70 that the engagement of the adjustment nut 96 on the end of the sleeve 120 prevents the existing pin retracting mechanism of the bogie from being disengaged by manipulating the control rod handle 48. When the actuator rod 92 is retracted back into the actuator 70, the existing pin retracting mechanism can be engaged and disengaged freely by manipulating the control rod handle 48 in the conventional manner.

While the present invention has been described by reference to a specific embodiment, it should be understood that modifications and variations of the invention may be constructed without departing from the scope of the invention defined in the following claims.

What is claimed is:

1. In a mechanism for selectively connecting and disconnecting a truck trailer and a bogie supporting said trailer for adjusting the relative positions between the trailer and bogie, said bogie having a pneumatic brake system, the improvement comprising:
   means for pneumatically connecting and disconnecting said trailer and said bogie; and
   means for interfacing said pneumatic connecting and disconnecting means with said pneumatic brake system and for sensing the presence and absence of pneumatic pressure in said pneumatic brake system and for controlling said pneumatic connecting and disconnecting means in response to a sensed presence or absence of pneumatic brake pressure in said pneumatic brake system to thereby prevent said pneumatic connecting end disconnecting means from disconnecting said trailer from said bogie without said bogie pneumatic brake system being engaged.

2. The apparatus of claim 1, wherein:
said bogie pneumatic brake system includes a service brake line and an emergency brake line, and said interfacing means is adapted for communication with said emergency brake line for sensing the presence and absence of pneumatic pressure in said emergency brake line.

3. The apparatus of claim 2, wherein:
said interfacing means is adapted for fluid communication with said emergency brake line.

4. The apparatus of claim 1, wherein:
said bogie pneumatic brake system includes at least one pneumatic brake line, and said interfacing means is adapted for communication with said pneumatic brake line to thereby prevent said pneumatic connecting and disconnecting means from disconnecting said trailer from said bogie when pneumatic pressure is present in said pneumatic brake line.

5. The apparatus of claim 1, wherein:
said bogie pneumatic brake system includes a pneumatic brake line for conducting pneumatic pressure and a pneumatic pressure tank for storing pneumatic pressure, and said interfacing means is adapted to communicate with said pneumatic brake line and is adapted to interface said pneumatic pressure tank with said pneumatic connecting and disconnecting means to thereby prevent said pneumatic connecting and disconnecting means from disconnecting said trailer from said bogie in response to pneumatic pressure being present in said pneumatic brake line.

6. The apparatus of claim 1, wherein:
said bogie pneumatic brake system includes a pneumatic brake line for conducting pneumatic pressure and a pneumatic pressure tank for storing pneumatic pressure, and said interfacing means is adapted to communicate with said pneumatic brake line and is adapted to interface said pneumatic pressure tank with said pneumatic connecting and disconnecting means to thereby enable said pneumatic connecting and disconnecting means to disconnect said trailer from said bogie only in response to pneumatic pressure being absent from said pneumatic brake line.

7. The apparatus of claim 5, wherein:
said bogie pneumatic brake system includes a pneumatic service brake line and a pneumatic emergency brake line, and said interfacing means is adapted to communicate with said emergency brake line to prevent said pneumatic connecting and disconnecting means from disconnecting said trailer from said bogie in response to pneumatic pressure being present in said emergency brake line.

8. The apparatus of claim 5, wherein:
said interfacing means includes a pneumatic pressure sensitive valve adapted to communicate with said pneumatic pressure brake line and adapted to control fluid communication between said pneumatic pressure tank and said pneumatic connecting and disconnecting means to prevent communication of pneumatic pressure from said pneumatic pressure tank to said pneumatic connecting and disconnecting means in response to pneumatic pressure being present in said pneumatic brake line.

9. The apparatus of claim 8, wherein:
said pressure sensitive valve is adapted to enable communication of pneumatic pressure from said pneumatic pressure tank to said pneumatic connecting and disconnecting means in response to pneumatic pressure being absent from said pneumatic brake line.

10. In a manual mechanism of a truck trailer and bogie assembly for selectively connecting and disconnecting the truck trailer and bogie, the improvement comprising an apparatus for automatically operating the manual mechanism, the apparatus comprising:
means, adapted for connection to the manual mechanism, for operating the manual mechanism to disconnect the truck trailer and bogie in response to fluid pressure being supplied thereto;
means, in communication with the operating means, for selectively supplying fluid pressure thereto in response to manual actuation thereof; and,
means, in communication with the selective fluid supply means and adapted for communication with a braking assembly and a source of fluid pressure of the truck trailer and bogie assembly, for automatically supplying fluid pressure from the source of fluid pressure to the selective fluid supply means in response to engagement of the braking assembly, and for automatically interrupting supply of fluid pressure from the source of fluid pressure to the selective fluid supply means in response to disengagement of the braking assembly.

11. The apparatus of claim 10, wherein:
the automatic fluid supply means is adapted for communication with a fluid conducting brake line of the braking assembly for supplying fluid pressure from the source of fluid pressure to the selective fluid supply means in response to an absence of fluid pressure in the brake line, and for interrupting supply of fluid pressure from the source of fluid pressure to the selective fluid supply means in response to a presence of fluid pressure in the brake line.

12. The apparatus of claim 11, wherein:
the brake line of the braking assembly is an emergency brake line of the braking assembly that causes emergency brakes of the truck trailer and bogie assembly to engage in response to an absence of fluid pressure in the brake line, and causes the emergency brakes to disengage in response to a presence of fluid pressure in the brake line.

13. The apparatus of claim 11, wherein:
the automatic fluid supply means is a fluid pressure sensitive valve that is adapted to open and establish fluid communication between the source of fluid pressure and the selective fluid supply means in response to the valve sensing the absence of fluid pressure in the brake line, and is adapted to close and interrupt fluid communication between the source of fluid pressure and the selective fluid supply means in response to the valve sensing a presence of fluid pressure in the brake line.

14. The apparatus of claim 13, wherein:
the fluid pressure sensitive valve is adapted for connection in fluid communication with the source of fluid pressure and the brake line and is connected in fluid communication with the selective fluid supply means by a plurality of fluid conduits.

15. The apparatus of claim 11, wherein:
a first cut off valve is adapted to be interposed between the automatic fluid supply means and the source of fluid pressure to control communication of fluid pressure from the source of fluid pressure to the automatic fluid supply means, and a second cut off valve is adapted to be interposed between the automatic fluid supply means and the brake line to control communication of fluid pressure from the brake line to the automatic fluid supply means.

16. The apparatus of claim 10, wherein:
the operating means includes a bracket member adapted to be mounted on the truck bogie, a fluid pressure actuator mounted on the bracket, the actuator having a reciprocating rod extending therefrom and means inside the actuator for causing the rod to move out of the actuator in response to fluid pressure being supplied to the operating means, and for causing the rod to move into the actuator in response to an interruption of fluid pressure supplied to the operating means, a pivot pin mounted on the bracket and a pivot arm pivotally mounted on the pivot pin, the pivot arm having first and second ends on opposite sides of the pivot pin, the first end of the pivot arm being connected to the reciprocating rod and the second end of the pivot arm being adapted to be connected to the manual mechanism.

17. The apparatus of claim 16, wherein:
the second end of the pivot arm adapted to be connected to the manual mechanism is spaced further away from the pivot pin than the connection of the first end of the pivot arm to the reciprocating rod.

18. The apparatus of claim 16, wherein:
the second end of the pivot arm is adapted to be connected to the manual mechanism by a second bracket connectable to the manual mechanism and a link member pivotally connected to the second bracket and pivotally connected to the second end of the pivot arm.

19. The apparatus of claim 10, wherein:
the operating means includes a reciprocating rod having a free end, the rod moving in a first direction in response to fluid pressure being supplied to the operating means and the rod moving in a second direction in response to an interruption in supply of fluid pressure to the operating means, and means for connecting the free end of the rod to the manual mechanism, the connecting means being moved by the rod when the rod moves in the first direction, and the connecting means being adapted to be moved by the manual mechanism when the rod is moved in the second direction.

20. In a pin extending and retracting mechanism of a truck trailer and bogie assembly for selectively connecting the truck trailer and bogie by extending pins of the mechanism and disconnecting the truck trailer and bogie by retracting the pins of the mechanism, the improvement comprising an apparatus for automatically operating the pin extending and retracting mechanism, the apparatus comprising:
means, adapted to be connected to the pin extending and retracting mechanism, for operating the mechanism to retract the pins and disconnect the truck trailer and bogie in response to fluid pressure being supplied thereto;
means, in fluid communication with the operating means, for selectively supplying fluid pressure to the operating means in response to manual actuation thereof; and,
means, adapted for fluid communication with a source of fluid pressure of the truck trailer and bogie assembly and for fluid communication with a fluid conducting brake line of the truck trailer and bogie assembly, and in fluid communication with the selective fluid supply means, for automatically supplying fluid pressure from the source of fluid pressure to the selective fluid supply means in response to an absence of fluid pressure in the brake line, and for automatically interrupting supply of fluid pressure from the source of fluid pressure to the selective fluid supply means in response to a presence of fluid pressure in the brake line.

21. The apparatus of claim 20, wherein:
the automatic fluid supply means includes a fluid pressure sensitive valve adapted for communication with the source of fluid pressure through a first fluid conduit, communicating with the selective fluid supply means through a second fluid conduit, and adapted for communication with the brake line through a third fluid conduit, the fluid pressure sensitive valve opening and establishing fluid communication between the first and second fluid conduits in response to the valve sensing an absence of fluid pressure in the third fluid conduit, and the valve closing and interrupting fluid communication between the first and second fluid conduits and draining the second fluid conduit in response to the valve sensing a presence of fluid pressure in the third fluid conduit.

22. The apparatus of claim 21, wherein:
the brake line is an emergency brake line of the truck trailer and bogie assembly that causes emergency brakes of the truck trailer and bogie assembly to engage in response to an absence of fluid pressure in the brake line, and causes the emergency brakes to disengage in response to a presence of fluid pressure in the brake line.

23. The apparatus of claim 21, wherein:
a first manually actuated cut off valve is connected to the first conduit and is adapted to control communication of fluid pressure from the source of fluid pressure to the fluid pressure sensitive valve, and a second manually actuated cut off valve is connected to the third conduit and is adapted to control communication of fluid pressure from the brake line to the fluid pressure sensitive valve.

24. The apparatus of claim 21, wherein:
the selective fluid supply means is a manually actuated control valve communicating with the fluid pressure sensitive valve through the second conduit and communicating with the operating means through a fourth conduit, the manually actuated control valve selectively controls communication of fluid pressure from the fluid pressure sensitive valve to the operating means.

25. The apparatus of claim 24, wherein:
the operating means includes a fluid pressure actuator adapted for mounting on the truck bogie, the actuator having a reciprocating rod extending therefrom and means inside the actuator for causing the rod to move out of the actuator in response to fluid pressure being supplied to the operating means, and for causing the rod to move into the actuator in response to an interruption of fluid pressure supplied to the operating means, the operating means also includes a pivot arm adapted for mounting on the truck bogie for pivoting movement relative to the bogie, the pivot arm having a first end connected to the rod and a second end connectable to the pin extending and retracting mechanism.

26. The apparatus of claim 25, wherein:
the pivot arm is adapted for mounting on the truck bogie for pivoting movement of the arm about a midpoint of the arm between the connection of the first end of the arm to the reciprocating rod and the connection of the second end of the arm connectable to the pin extending and retracting mechanism.

27. The apparatus of claim 26, wherein:
the second end of the arm connectable to the pin extending and retracting mechanism is spaced at a greater distance from the midpoint of the arm than the first end of the arm connected to the reciprocating rod.

* * * * *